US008494259B2

(12) United States Patent
Aguilar et al.

(10) Patent No.: US 8,494,259 B2
(45) Date of Patent: Jul. 23, 2013

(54) BIOLOGICALLY-INSPIRED METADATA EXTRACTION (BIME) OF VISUAL DATA USING A MULTI-LEVEL UNIVERSAL SCENE DESCRIPTOR (USD)

(75) Inventors: Mario Aguilar, Jacksonville, AL (US); Aaron Hawkins, Raleigh, NC (US); Jiangying Zhou, Durham, NC (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 672 days.

(21) Appl. No.: 12/648,123

(22) Filed: Dec. 28, 2009

(65) Prior Publication Data

US 2011/0158510 A1    Jun. 30, 2011

(51) Int. Cl.
G06K 9/62 (2006.01)
G06K 9/46 (2006.01)
G06K 9/50 (2006.01)

(52) U.S. Cl.
USPC ............ 382/159; 382/190; 382/199; 382/224

(58) Field of Classification Search
USPC ............ 302/103, 159, 190, 199, 224; 706/20
See application file for complete search history.

(56) References Cited

U.S. PATENT DOCUMENTS

| 7,580,907 | B1 | 8/2009 | Rhodes | |
|---|---|---|---|---|
| 7,606,777 | B2 | 10/2009 | Serre | |
| 2006/0098889 | A1* | 5/2006 | Luo et al. | 382/254 |
| 2006/0182357 | A1* | 8/2006 | Liu et al. | 382/239 |
| 2010/0290705 | A1* | 11/2010 | Nakamura | 382/173 |

OTHER PUBLICATIONS

Neil et al ("Saliency, Attention, and Visual search: An information theoretic approach", Journal of Vision (2009) 9(3):5, 1-24).*
Aude et al ("Scene-Centered Description from Spatial Envelope Properties", Artificial Intelligence Laboratory, MIT, BMCV 2002,LNCS 2525, pp. 263-272).*
Stephen et al ("ARTSCENE: A Neural System for Natural Scene Classification", Technical Report CAS/CNS-TR-07-017, Department of Cognitive and Neural Systems, Boston University, Sep. 27, 2007, pp. 1-28).*
Nandagopalan et al ("A universal model for content-based image retrieval", World Academy of Science, Engineering and Technology 46 2008, pp. 644-647).*
Thomas Serre et al., A New Biologically Motivated Framework for Robust Object Recognition, Massachusetts Institute of Technology—computer science and artificial intelligence laboratory, Nov. 2004, pp. 1-10.
Antonio Torralba et al., Context-Based Vision System for Place and Object Recognition, Massachusetts Institute of Technology—computer science and artificial intelligence laboratory, Mar. 2003, pp. 1-10.
Neil D. Bruce et al., Saliency, attention, and visual search: An information theoretic approach, Journal of Vision (2009) 9(3):5, 1-24, http://journalofvision.org/9/3/5/, published Mar. 13, 2009, pp. 1-24.

(Continued)

*Primary Examiner* — Amara Abdi
(74) *Attorney, Agent, or Firm* — Eric A. Gifford

(57) ABSTRACT

A computer vision system provides a universal scene descriptor (USD) framework and methodology for using the USD framework to extract multi-level semantic metadata from scenes. The computer vision system adopts the human vision system principles of saliency, hierarchical feature extraction and hierarchical classification to systematically extract scene information at multiple semantic levels.

22 Claims, 15 Drawing Sheets

OTHER PUBLICATIONS

Stanley Bileschi et al., A Unified System for Object Detection, Texture Recognition, and Context Analysis Based on the Standard Model Feature Set, The Center for Biological and Computational Learning, Massachusetts Institute of Technology, pp. 1-11.

Emanuel Diamant, Paving the Way for Image Understanding: A New Kind of Image Decomposition is Desired, SCIA 2005, Springer-Verlag Berlin Heidelberg 2005, LNCS 3540, pp. 17-24, 2005.

Yann Lecun et al., Learning methods for generic object recognition with invariance to pose and lighting, in Proceedings of CVPR (Computer Vision and Pattern Recognition) '04, IEEE Press, 2004.

Thomas Serre et al., Object Recognition with Features Inspired by Visual Cortex, Proceedings of 2005 IEEE Computer Society Conference on Computer Vision and Pattern Recognition, Jun. 20-25, 2005 (pp. 994-1000).

Antonio Torralba et al., Modeling global scene factors in attention, Artificial Intelligence Laboratory, Massachusetts Institute of Technology, vol. 20, No. 7/Jul. 2003/J. Opt. Soc. Am. A, pp. 1407-1418.

Stephen Grossberg et al., ARTSCENE: A Neural System for Natural Scene Classification, Department of Cognitive and Neural Systems, Center for Adaptive Systems, Center of Excellence for Learning in Education, Science, and Technology, Boston University, Technical Report CAS/CNS-TR-07-017, pp. 1-28.

* cited by examiner

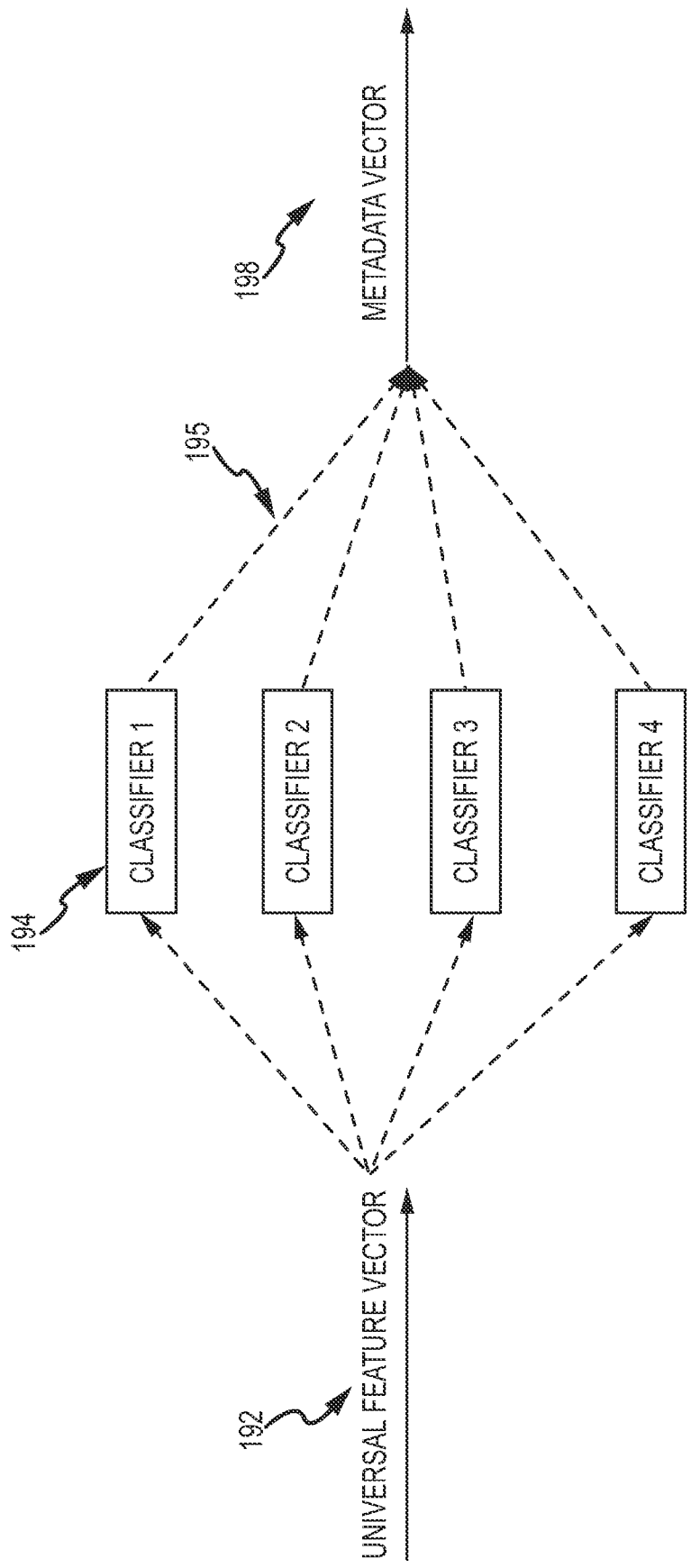

BIOLOGICALLY-INSPIRED METADATA EXTRACTION (BIME) OF VISUAL DATA USING A MULTI-LEVEL UNIVERSAL SCENE DESCRIPTOR (USD)

BACKGROUND OF THE INVENTION

1. Field of the Invention

This invention relates to the use of biologically-inspired scene descriptors for the extraction of metadata.

2. Description of the Related Art

Computer vision is the science and technology of machines that see. As a scientific discipline, computer vision is concerned with the theory behind artificial systems that extract information about a scene from images. The image data can take many forms, such as video sequences, views from multiple cameras, or multi-dimensional data from a medical scanner. As a technological discipline, computer vision seeks to apply its theories and models to the construction of computer vision systems.

Computer vision is closely related to the study of biological vision. The field of biological vision studies and models the physiological processes behind visual perception in humans and other animals. Computer vision, on the other hand, studies and describes the processes implemented in software and hardware behind artificial vision systems.

One application of computer vision is to extract information from the image data, interpret the information and append it as metadata to the image or sequence of images. Metadata is "data about data" and provides context and descriptions for the image data. Metadata is used to facilitate the understanding, usage, and management of data, both by humans and computers. Thus metadata can describe the data conceptually so that others can understand them; it can describe the data syntactically so others can use them; and the two types of descriptions together can facilitate decisions about how to manage the data. When structured into a hierarchical arrangement, metadata is more properly called an ontology or schema.

For digital images or sequences of images metadata may be as simple as date and time created, details of the image capture, etc. Metadata may also be extracted that provides a measure of scene understanding at one or more semantic levels. Semantic information reflects the structure and meaning in the image data. Generally speaking image understanding involves the detection and recognition of objects, the relationships of objects and the context in which the objects exist in a scene.

The extraction of metadata that provides image understanding from complex visual environments e.g. natural imagery that contains complex evolving visual elements is difficult. Most vision systems are modeled on how a computer sees the world, rather than the human visual system, and are subject to one or more constraints or limitations in order to provide useful metadata. The image data is typically segmented in a supervised procedure to identify certain segments of the image for consideration. Supervised segmentation is not a practical constraint in many applications. Systems are typically not robust to changes in viewing conditions. The metadata may be limited to provide semantic information only at one level. The system may not be scalable to complex scenes or broad classes of scenes. In many cases, the extraction of scene descriptors is application specific, not universal.

To address these limitations researches are attempting to model the extraction of metadata on biological visual systems. Because humans and primates outperform in almost any measure the best machine vision systems, building a system that emulates object recognition in the cortex and image understanding in higher-level cognitive processes has always been an attractive idea. However, for the most part, the use of visual neuroscience in computer vision has been limited to a justification of Gabor filters. More recent research efforts are investigating the extraction and use of so-called biologically-inspired visual features to further image understanding. Each feature is classified separately to provide a semantic descriptor. These descriptors are combined to provide metadata.

SUMMARY OF THE INVENTION

The present invention provides a universal scene descriptor (USD) framework and methodology for using the USD framework to extract multi-level semantic metadata from scenes.

This is accomplished by emulating the visual cortex and higher-level cognitive processes of the human brain. When confronted with a complex scene, the human visual system naturally decomposes the scene into smaller regions of interest that are the most salient. Instead of trying to process the entire scene, each region is processed sequentially to enable a systematic decomposition of critical information content in the scene. The human visual system extracts a hierarchy of features from each region of the scene and classifies that hierarchy to extract semantic information about the scene at multiple levels of a complex scene understanding hierarchy. This multi-level semantic information is integrated to provide image understanding. The visual cortex and cognitive processes are of course far more sophisticated than this simple explanation and what can be emulated by computer vision. However, by adopting the principles of saliency, systematic hierarchical feature extraction and aggregation into a universal scene descriptor and classification of that USD in a semantic hierarchy computer vision may more closely emulate that of humans.

In an embodiment, the computer vision system is provided with a sequence of one or more unsegmented images of a scene. The system performs an unsupervised decomposition of the scene captured in each image into the N most salient regions of interest (ROIs). The system extracts multiple classes of biologically-inspired visual features from the scene for each image. These classes may include object-tuned features, ROI-to-ROI geometric features, and a hierarchy of contextual features including object-tuned, ROI and scene spatial-layout features. The spatial layout feature may be a measure of texture. The system assembles the visual features into a universal feature vector, which defines the USD, for each ROI. The universal feature vectors are universal in the sense that they describe the scene without regard to any particular application for which metadata may be extracted and used. The universal feature vector suitably has a standardized configuration e.g. a fixed length and defined ranges for extracted feature values.

To extract metadata for the scene, the computer vision system presents the universal feature vector for each ROI to a plurality of classifiers that extract semantic information from the scene at different levels of a complex scene understanding hierarchy and output scene semantic descriptors. Each classifier is presented with the entire hierarchy of extracted features in the form of the universal feature vector. The classifiers are trained to extract semantic information for a particular application. The system assembles the scene semantic descriptors into a metadata vector for each ROI and converts the metadata vector into a structured description for each ROI. The system assembles the structured descriptions for all ROIs in a scene into a single structured description. The structured description is stored as metadata for the scene.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 12a and 12b are flow and block diagrams of the presentation of the USD feature vector to multiple semantic classifiers that generate scene semantic descriptors at different levels of a complex scene understanding hierarchy.

DETAILED DESCRIPTION OF THE INVENTION

The present invention provides a universal scene descriptor (USD) framework and methodology for using the USD framework to extract multi-level semantic metadata from scenes. This is accomplished by emulating the visual cortex and higher-level cognitive processes of the human brain. When confronted with a complex scene, the human visual system naturally decomposes the scene into smaller regions of interest that are the most salient. Instead of trying to process the entire scene, each region is processed sequentially. The human visual system extracts a hierarchy of features from each region of the scene and classifies that hierarchy to extract semantic information about the scene at multiple levels of a complex scene understanding hierarchy. This multi-level semantic information is integrated to provide image understanding. The visual cortex and cognitive processes are of course far more sophisticated than this simple explanation and what can be emulated by computer vision. However, by adopting the principles of saliency, hierarchical feature extraction and aggregation into a universal scene descriptor and classification of that USD in a semantic hierarchy computer vision may more closely emulate that of humans.

Figure 1:
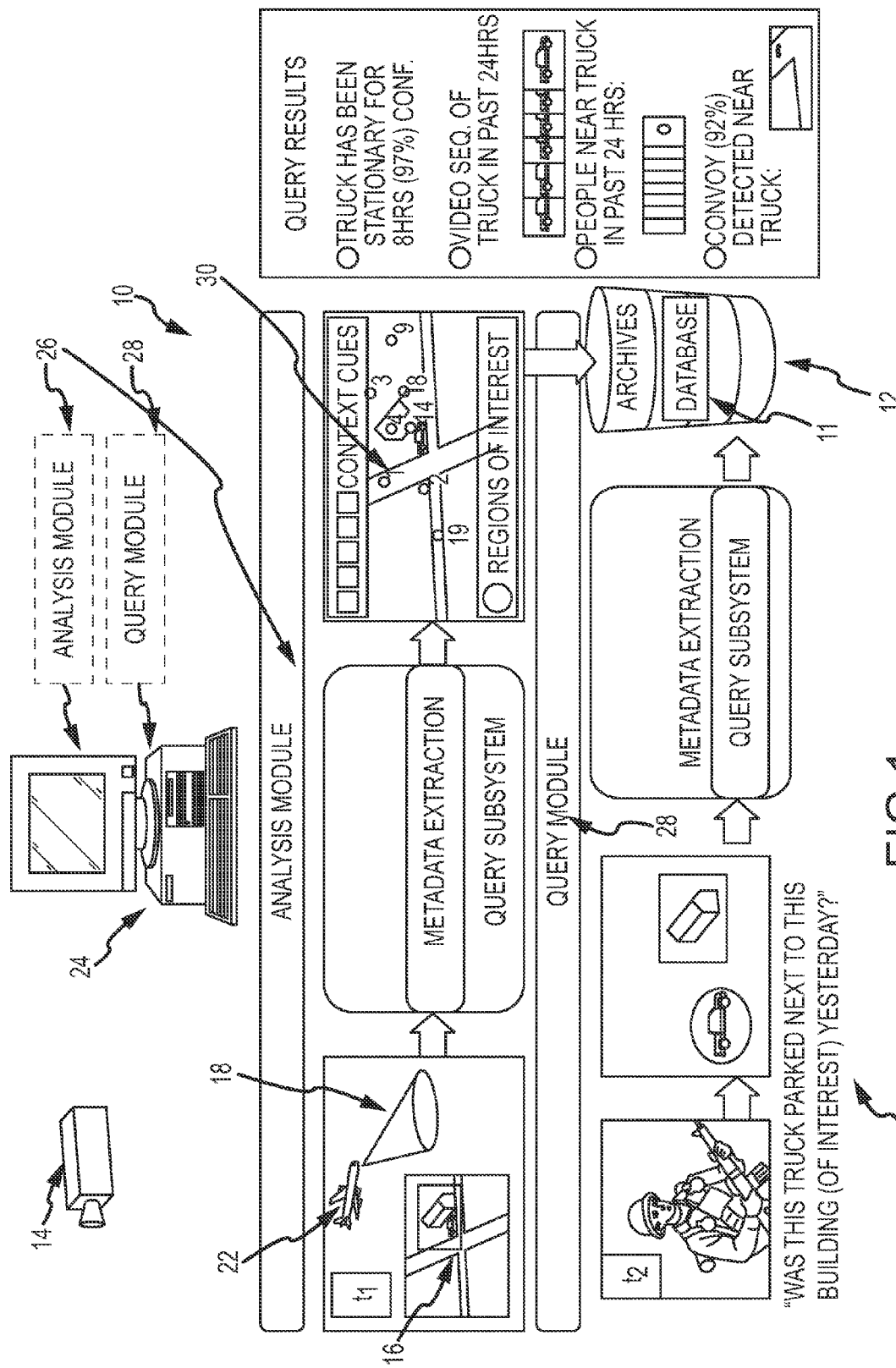
FIG. 1 is a diagram of a BIME system.
Figure 2:
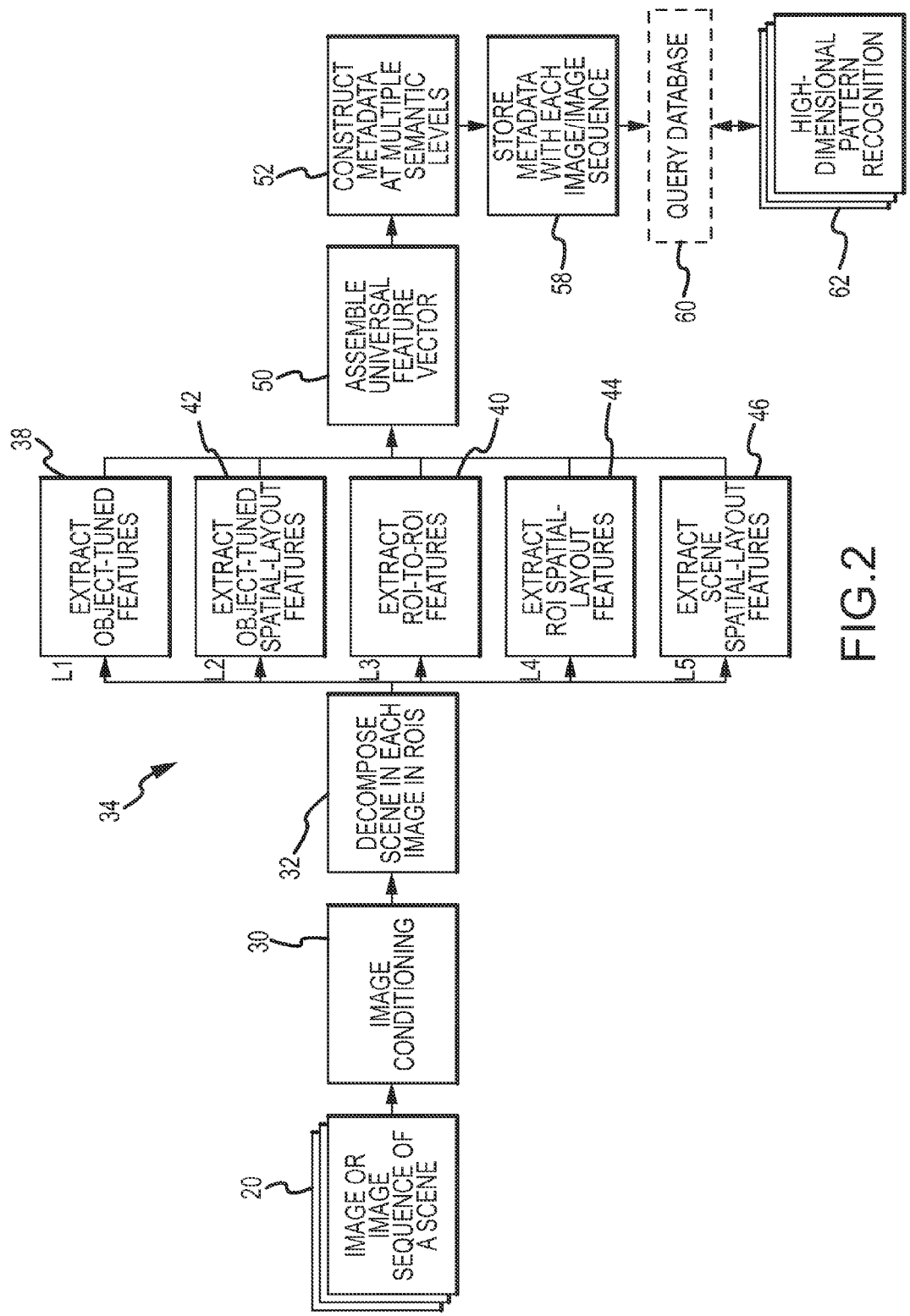
FIG. 2 is a flow diagram of a method of metadata extraction using multi-level universal scene descriptors.
Figure 3:
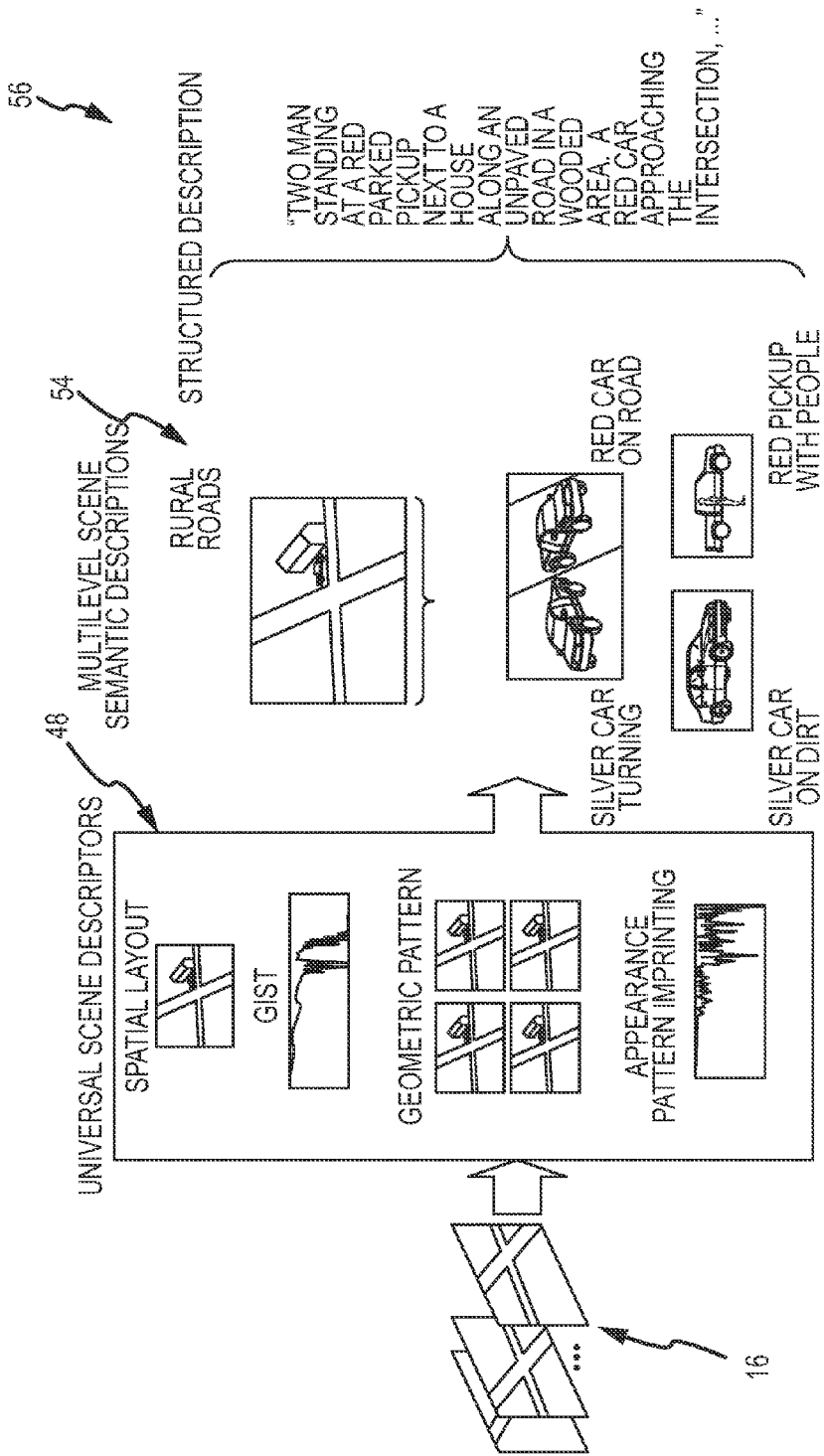
FIG. 3 is a flow diagram of an exemplary application to a sequence of scenes illustrating the development of USDs, scene semantic descriptors and integrated SQL statement.

Referring now to FIGS. 1, 2 and 3, in an exemplary embodiment a computer vision system 10 is configured to extract and store metadata with a sequence of one or more images of a scene in a database 11 (such as a relational database) in storage 12 and to evaluate the metadata to respond to queries. Semantic information, which reflects the structure and meaning of information, is extracted at multiple levels of a complex scene understanding hierarchy for multiple salient regions of the scene and assembled into a structured description for indexing and archiving. The system may evaluate and respond to queries. These scenes include complex evolving visual elements that have meaning at multiple different semantic levels of a complex scene understanding hierarchy.

The system includes a means 14 such as a digital camera or video camera for capturing a sequence of one or more images 16 of a scene 18 (step 20). In this example, the camera is mounted on an unmanned aerial vehicle (UVA) 22 that is conducting aerial surveillance in a theater of operations. More generally, a digital image is produced by one or several image sensors, which, besides various types of light-sensitive cameras, include thermal sensors, range sensors, tomography devices, radar, ultra-sonic cameras, etc. Depending on the type of sensor, the resulting image data is an ordinary 2D image, a 3D volume, or an image sequence. The pixel values typically correspond to measured intensity in one or several spectral bands (gray images or color images), but can also be related to various physical measures, such as depth, absorption or reflectance of sonic or electromagnetic waves, or nuclear magnetic resonance.

A computer 24 including one or more processors and memory is configured to implement an analysis module 26 and a query module 28. The "computer" may be a single stand-alone computer, a plurality of computers or an embedded device, such as an ASIC attached to the camera. The analysis module is suitably configured to condition the images to enhance quality and minimize noise interference (step 30). Conditioning may include such operations as re-sampling to assure that the image coordinate system is correct, noise reduction to assure that sensor noise does not introduce false information, contrast enhancement to assure that relevant information can be detected and a scale-space representation to enhance image structures at locally appropriate scales.

Analysis module 26 decomposes the scene captured in each image 16 into the N most salient regions of interest (ROIs) 30 (step 32). In this example, each ROI 30 is signified by a red circle overlaid on image 16 and assigned a priority number based on its relative saliency. The salient ROIs are those regions that stick out or are the most interesting from a visual perspective in the scene. In general, the analysis module will identify the N most salient ROIs that satisfy a threshold saliency. N is typically an integer greater than 1. Although rare, an individual image may not include any regions that are differentiated enough to be salient. In this case, the entire image is suitably designated as a single ROI. This "saliency layer" processing emulates the initial stages of the human visual cortex in which a scene is decomposed into the most salient regions.

For each salient ROI 30 in each image 16, analysis module extracts multiple classes of biologically-inspired hierarchical visual features for scene 18 (step 34). In an embodiment, the extraction of a hierarchy of visual features includes extracting object-tuned features L1 (step 38), extracting ROI-to-ROI geometric features L3 (step 40) and extracting different levels of spatial-layout features (so-called contextual features) including extracting object-tuned spatial-layout features L2 (step 42), ROI spatial-layout features L4 (step 44) and scene spatial-layout features L5 (step 46). The spatial-layout features may, for example, represent a measure of texture at different levels of the scene. These features extract information at different levels of scene complexity and together allow for the extraction of semantic information at different levels. As shown in FIG. 3 a spatial layout L1 is a distribution of visual attributes whether raw pixels or calculated features. Gist L5 represent scene context and may be either a labeled classification or a statistical distribution of raw pixels. A geometric pattern L3 is a set to spatial relationships expressed in relative measures. Appearance pattern imprinting L2 defines a signature for an object that can be used to recognize or track the object based on visual attributes. This set of features L1-L5 is merely representative of a hierarchy of visual features. Different or additional features may be employed as part of the process described in L1-L5 or as separate feature sets. For example, motion features between images could be extracted. The extracted features are suitably output as L1 to L5 feature vectors. Each vector is suitably of a specified fixed length with values in a specified range. This hierarchical "description level" processing emulates the hierarchical feature extraction performed by the visual cortex.

For each salient ROI 30 in each image 16, analysis module 26 assembles the individual feature vectors into a universal feature vector 48, which provides a USD (step 50). This vector is independent of the specific metadata application. The universal feature vector 48 suitably has the same standardized format for each ROI in each image e.g. the same dimensionality, length, range of values for the different features.

For each salient ROI 30 in each image 16, analysis module 26 processes the corresponding universal feature vector to construct metadata at multiple semantic levels (step 52). This may be suitably accomplished by presenting the vector to multiple classifiers trained to extract semantic information in the form of scene semantic descriptors 54 at different levels of a complex scene understanding hierarchy. These classifiers are typically trained for a specific metadata application. For example, if the application is surveillance in an urban combat environment, the classifiers may try to identify vehicles, buildings, and people and the relationship of those entities. The classifiers may identify a silver car, a red car and a building at a low level. The classifiers may identify orientations of the vehicles at another level and the relationship of the vehicles and building at another level. The analysis module converts the hierarchy of semantic descriptors into a structured description (e.g. words that describe the scene) for each ROI. This hierarchical "analysis layer" and "interpretation level" processing emulates the visual cortex and cognitive processes performed by a human in image understanding.

The analysis module 26 collects the metadata for each ROI, assembles it into a single structured description 56 for the image and stores it with the image or sequence of images (step 58). Metadata can be stored either internally, in the same file as the data, or externally, in a separate file. Metadata that is embedded with content is called embedded metadata. A data repository typically stores the metadata detached from the data. Both ways have advantages and disadvantages. Internal storage allows transferring metadata together with the data it describes; thus, metadata is always at hand and can be manipulated easily. This method creates high redundancy and does not allow holding metadata together. External storage allows bundling metadata, for example in a database, for more efficient searching. There is no redundancy and metadata can be transferred simultaneously when using streaming. The metadata can be used for indexing or archiving many different types of databases. In a relational database, the structured description of the metadata is provided in a Structured Query Language (SQL).

The query module 28 allows operators to pose queries to the database (step 60). The query module searches the metadata and performs a high-dimensional pattern recognition to match the query to the relevant metadata (step 62). The query module returns results 64 of the query to the operators. In this example, soldiers are surveilling an area covered by the UAV images and want to know "Was this truck parked next to this building yesterday?". The query module responds by providing the relevant information that the truck has been stationary for 8 hours, provides a video sequence of the truck in the past 24 hours, a video sequence of people near the truck in the past 24 hours and that a convoy was detected near the truck. The precise nature of the queries and the responses will depend on the type of database and the specific metadata application.

By implementing technologies in the computer vision system that better emulate the human visual cortex and cognitive processing for image understanding, namely the decomposition of scenes into salient ROIs, the extraction of hierarchical visual features, the formation of a universal feature vector that provides a universal scene descriptor and the classification of the USD to extract semantic information at multiple levels of the understanding hierarchy, the vision system provides greater image understanding.

Figure 4:
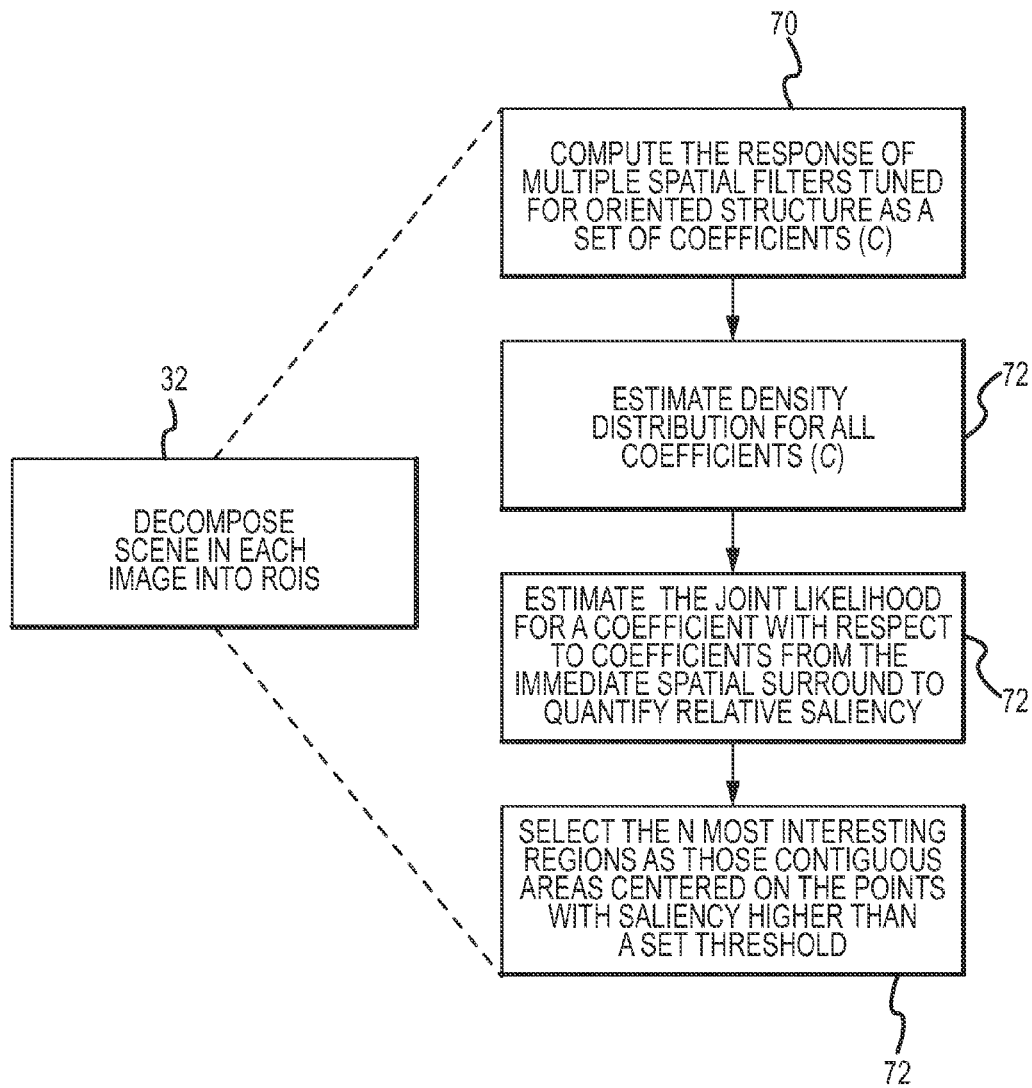
FIG. 4 is a flow diagram of an exemplary technique for decomposing each scene into at least one ROI.

Referring now to FIG. 4, an embodiment for decomposing the scene captured in each image into its salient ROIs (step 32) includes computing the response of multiple spatial filters tuned for oriented structures as a set of coefficients (C) (step 70), estimating a density distribution for all coefficients C (step 72), estimating a joint likelihood for a coefficient with respect to coefficients from the immediate spatial surround (neighborhood) to quantify relative saliency (step 74) and selecting the N most interesting regions as those contiguous areas centered on the most salient points with saliency higher than a set threshold or at least 2. Details of this approach for using saliency to decompose a scene are provided by Neil D. B. Bruce et al "Saliency, attention, and visual search: An information theoretic approach", Journal of Vision (2009) 9 (3):5, 1-24, pp. 1-24, which is hereby incorporated by reference. Other approaches for decomposing the scene to identify the most salient ROI are also contemplated. For example motion behavior between images may be used to determine saliency; moving objects tending to be more salient than stationary objects. These approaches should be unsupervised and identify ROIs that roughly emulate the process of the visual cortex. Traditional segmentation algorithms do not perform in this manner.

Figure 5A:
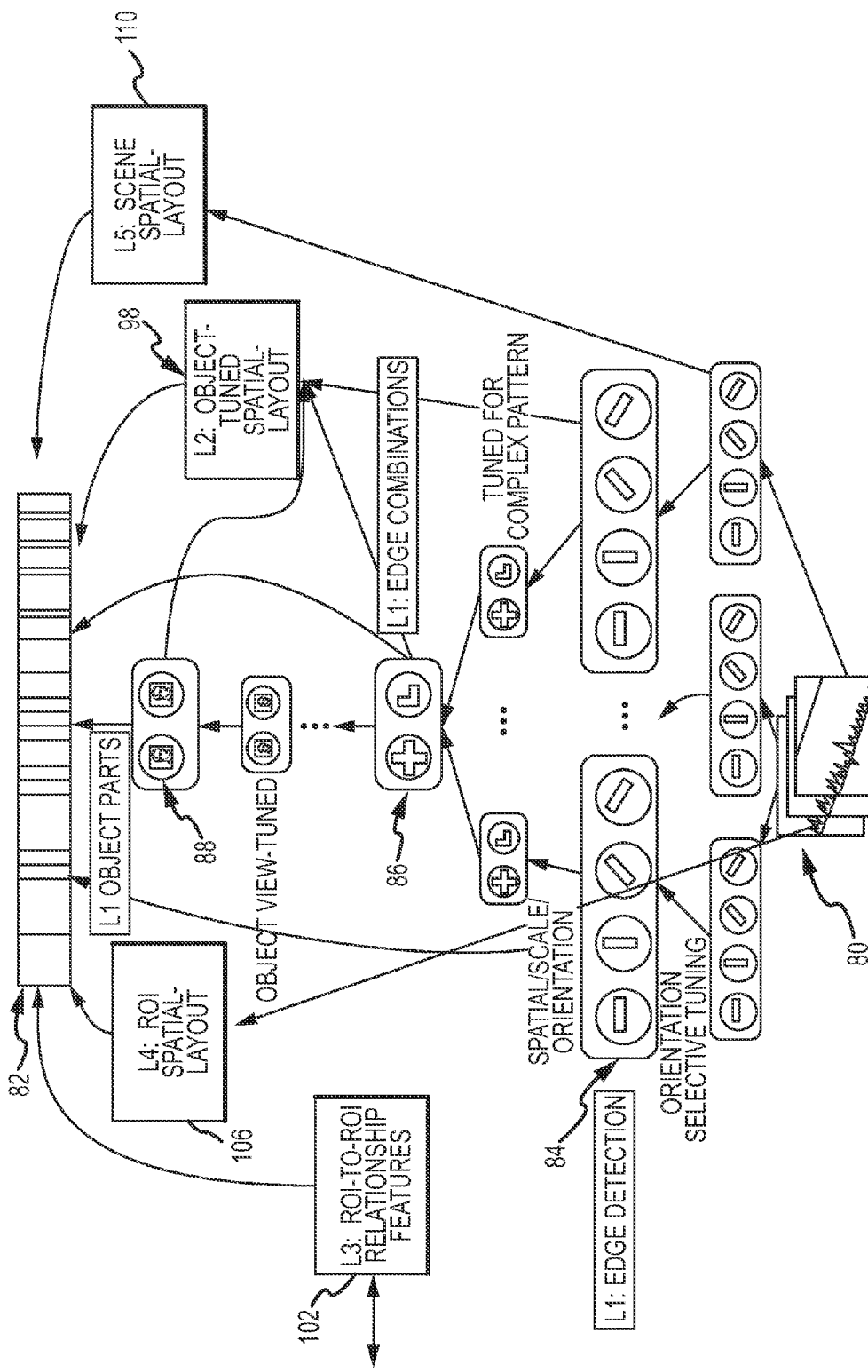
FIGS. 5a and 5b are a hierarchical flow diagram for illustrating the extraction of features L1 through L5 and assembly into a USD feature vector and an example of features L1 through L5 extracted from a simple scene.
Figure 5B:
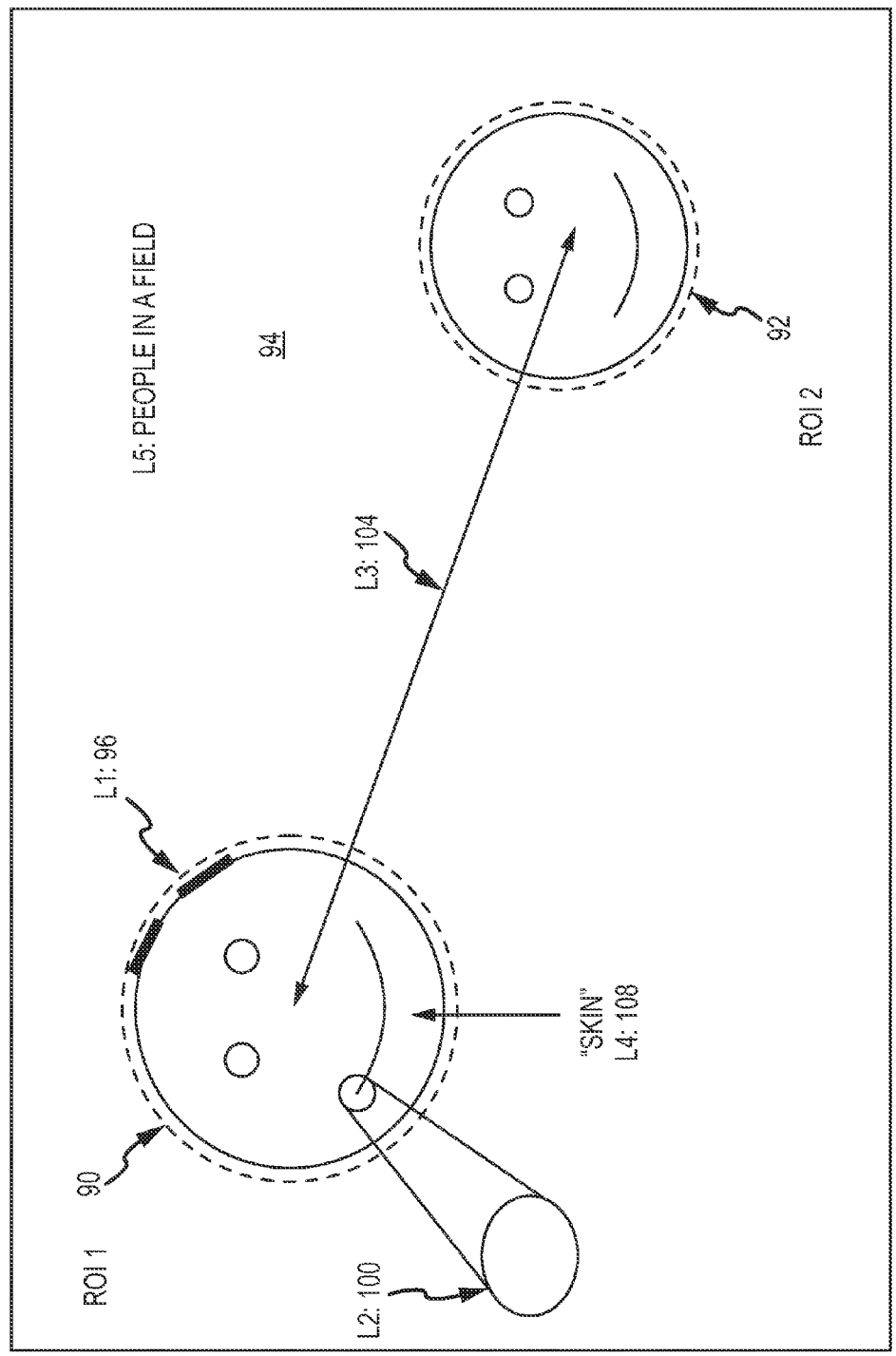

Referring now to FIGS. 5a and 5b, an exemplary approach for extraction of hierarchical visual features L1 through L5 from a sequence of images 80 to generate a universal feature vector 82 for each salient ROI with a simple example of such features is illustrated. In this example, objected-tuned features L1 are extracted using a multi-scale hierarchical filter bank and consist of edges 84, combinations of edges 86, and combinations into sub-parts 88. A plurality of orientation selective Gabor filters processes the scene data for the ROI.

The outputs of the Gabor filters are processed (e.g. spatial/scale/orientation) at a first layer to detect edges 84. At a second layer, the detected edges are tuned for complex patterns by a second layer of filters and multiple edge combinations 86 are detected. At a third level, the edge combinations are object view-tuned by a third layer of filters to detect specific object parts 88. The edges 84, combinations of edges 86 and object parts 88 are assembled into an L1 feature vector in universal feature vector 82. Details for using a hierarchy to decompose object-tuned characteristics of a scene are provided by Fukushima, K., "Neocognition: A self organizing neural network for a mechanism of pattern recognition unaffected by shift in position," Biol. Cybern., 36:193-201, 1980; Riesenhuber, M. and T. Poggio, "Hierarchical models of object recognition in cortex," Nat. Neursci., 2 (11):1019-25, 1999; Wersing, H. and E. Korner, "Learning optimized features for hierarchical models of invariant recognition," Neural Computation 15 (7), 2003; LeCun, Yann et al., "Learning methods for generic object recognition with invariance to pose and lighting," in Proceedings of CVPR (Computer Vision and Pattern Recognition) '04, IEEE Press, 2004 and Serre, T. et al., "Object Recognition with Features Inspired by Visual Cortex," Proceedings of 2005 IEEE Computer Society Conference on Computer Vision and Pattern Recognition, Jun. 20-25, 2005 (pp. 994-1000), which are hereby incorporated by reference.

In the simple scene depicted in FIG. 5b, of two faces 90 and 92 in a field 94 the L1 features for a first ROI (face 90) may include disjoint edges 96 around the periphery of the face, edges in the smile and edges in the eyes, combinations of those edges and finally edges joined contiguously to form the head outline, eyes and smile. The object sub-parts are not classified as eyes, smile etc but the structure of the parts is generated.

Object-tuned spatial layout features L2 98 are extracted from the L1 features, assembled into an L1 feature vector in universal feature vector 82. For example, a spatial layout feature may be a texture measure of the L1 features. As depicted in FIG. 5b, an L2 feature 100 is the spatial layout of features around an edge in the smile.

ROI-to-ROI relation features L3 102 are determined from the current ROI to one or more ROIs in the image, assembled into an L3 feature vector in universal feature vector 82. For example, a relationship feature L3 may be determined for the M closest ROI. If there are less than M+1 ROI in the image the last entries may be set to zero. The L3 feature may describe how far apart the ROIs are, what is the relative spatial relationship to the other ROI (e.g., to the left or to the right or above or below or an angle between the two), relative size of the objects, etc. The L3 feature may be extracted from L1 features, scene data or both. As depicted in FIG. 5b, an L3 feature 104 is a vector between the centroids of the two ROIs.

ROI spatial-layout features L4 106 are extracted from the scene data for the current ROI, assembled into an L4 feature vector in universal feature vector 82. For example, a spatial layout feature may be a texture measure of the scene data. As depicted in FIG. 5b, an L4 feature 108 is the texture across the ROI.

Scene spatial-layout feature L5 110 are extracted from scene data for the entire image, assembled into an L5 feature vector in universal feature vector 82. For example, a spatial layout feature may be a texture measure of the scene data that is than classified as one of a plurality of labeled scene classes. As depicted in FIG. 5b, an L5 feature 112 classifies the scene as "people in a field".

This hierarchical set of visual features more closely emulates the processes in the visual cortex than does a single feature or minimal subset of features.

Figure 6:
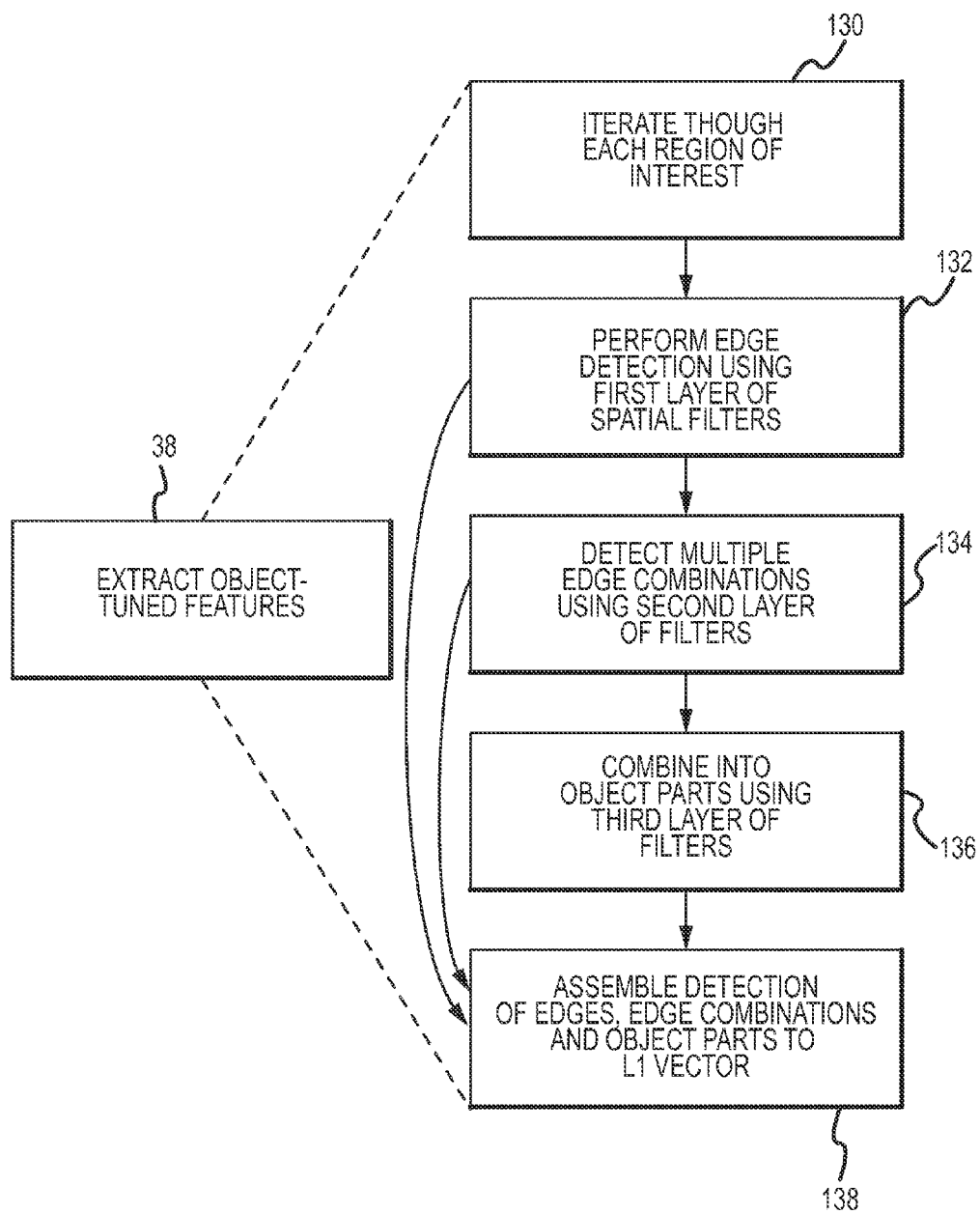
FIGS. 6-10 are flow diagrams of exemplary embodiments for extracting features L1 through L5, respectively.

Referring now to FIG. 6, an embodiment for the extraction of object-tuned features L1 (step 40) includes iterating through each ROI (step 130) to perform edge detection using a first layer of spatial filters (step 132), detect multiple edge combination using a second layer of filters (step 134), combine the combinations into object parts using a third layer of filters (step 136) and assemble the edges, edges combinations and objects parts to an L1 feature vector (step 138). A more detailed presentation of a method of extraction of an objected-tuned feature L1 is described by Thomas Serre et al. "A New Biologically Motivated Framework for Robust Object Recognition" MIT Computer Science and Artificial Intelligence Laboratory, AI Memo 2004-026, November 2004, pp. 1-11, which is hereby incorporated by reference.

Figure 7:
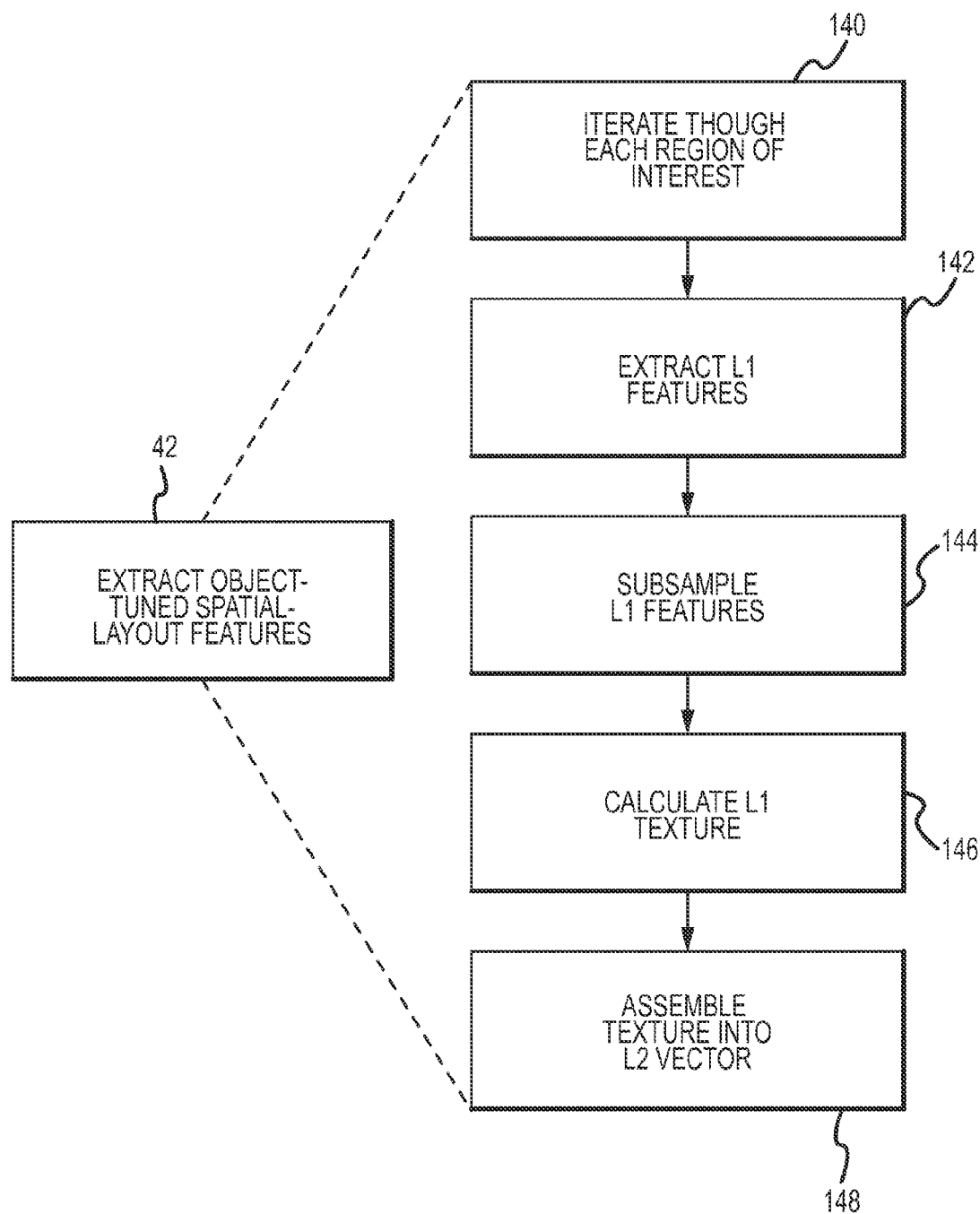

Referring now to FIG. 7, an embodiment for the extraction of object-tuned spatial-layout features L2 (step 42) includes iterating through each ROI (step 140), extracting L1 feature (step 142), subsampling the L1 features (step 144), calculating an L1 texture (step 146) and assembling the texture into an L2 feature vector (step 148). Techniques for computing a texture are well-known.

Figure 8:
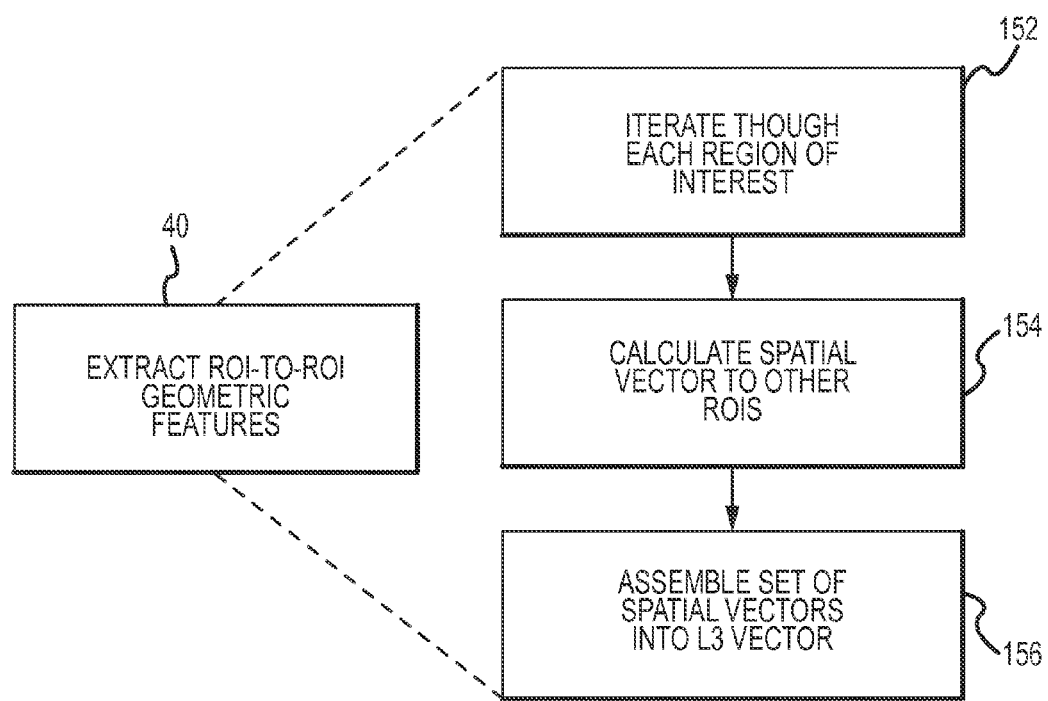

Referring now to FIG. 8, an embodiment for the extraction of ROI-to-ROI geometric relationship features L3 (step 40) includes iterating through each ROI (step 152), calculating a spatial vector to other ROIs (step 154) and assembling the set of spatial vectors into an L3 feature vector (step 156). In other embodiments, additional features such as relative size, relative orientation, relative texture etc. may be extracted to describe the geometric relationship between two ROI.

Figure 9:
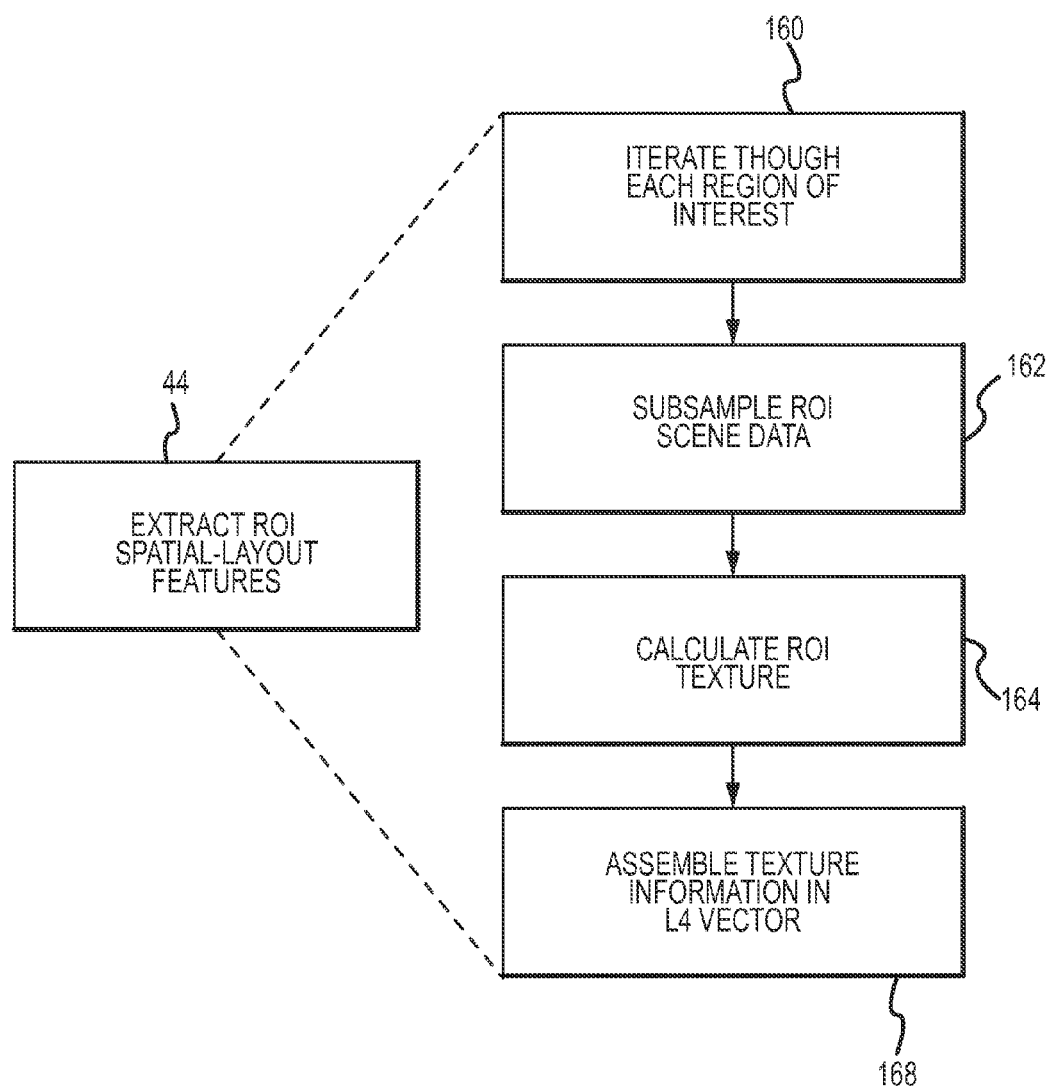

Referring now to FIG. 9, an embodiment for the extraction of ROI spatial-layout features L4 (step 44) includes iterating through each ROI (step 160), subsampling ROI scene data (step 162), calculating a ROI texture (step 164) and assembling the texture information in an L4 feature vector (step 168).

Figure 10:
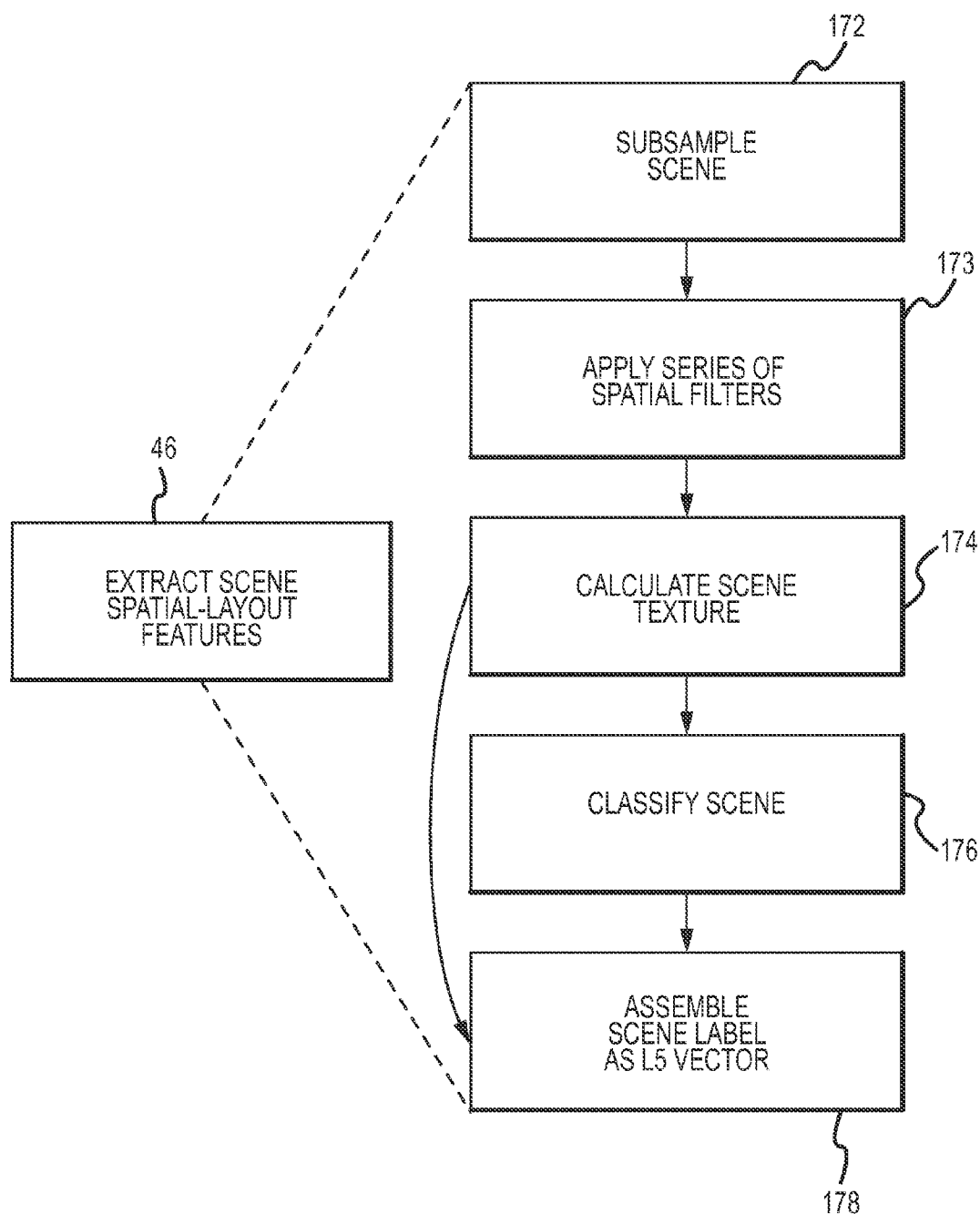

Referring now to FIG. 10, an embodiment for the extraction of scene spatial-layout features L5 (step 46) includes subsampling the scene in the entire image (step 172), applying a series of spatial filters to the subsampled scene (step 173), calculating a scene texture from the filtered scene data (step 174), classifying the scene based on the scene texture as one of a plurality of labeled scenes (step 176) and assembling the scene label as an L5 feature vector (step 178). In an alternate embodiment, the scene texture is output directly without classification. In another embodiment both the scene texture and classified scene are output. A more detailed description of embodiments for the L4 and L5 features is presented by Antonio Torralba et al. "Context-Based Vision System for Place and Object Recognition" MIT Artificial Intelligence Laboratory, AI Memo 2003-005 March 2003, pp. 1-11 and by Grossberg et al. "ARTSCENE: A neural system for natural scene classification". Journal of Vision, 9 (4):6, 1-19, 2009, http://journalofvision.org/9/4/6/, doi:10.1167/9.4.6., which are hereby incorporated by reference.

Figure 11:
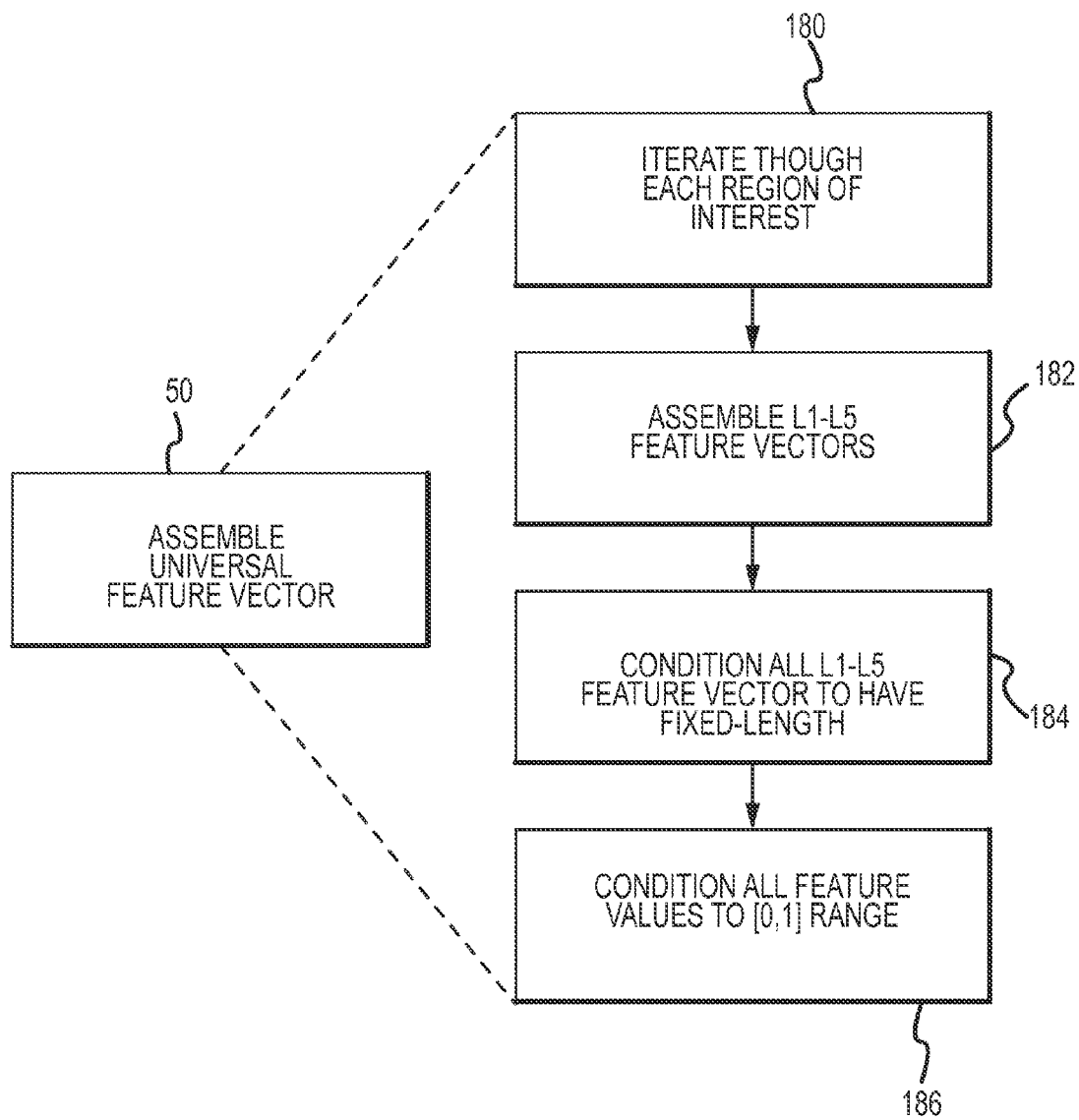
FIG. 11 is a flow diagram of an exemplary embodiment for assembling the USD feature vector.

Referring now to FIG. 11, the universal feature vector is assembled (step 50) by iterating through each ROI (step 180) to assemble the L1 through L5 fixed-length feature vectors (step 182), conditioning each of the L1-L5 feature vectors to have a fixed length (step 184) and conditioning all feature values to fall in a fixed range (step 186). The conditioning of length and range is done to provide a standardized universal scene descriptor. The conditioning may be done at the time each feature vector is assembled or when the universal feature vector is assembled. The universal feature vector may be a one-dimensional vector in which each of the L1 to L5 vectors appended end-to-end or may be a multi-dimensional vector in which each dimension corresponds to a different feature class.

Figure 12A:
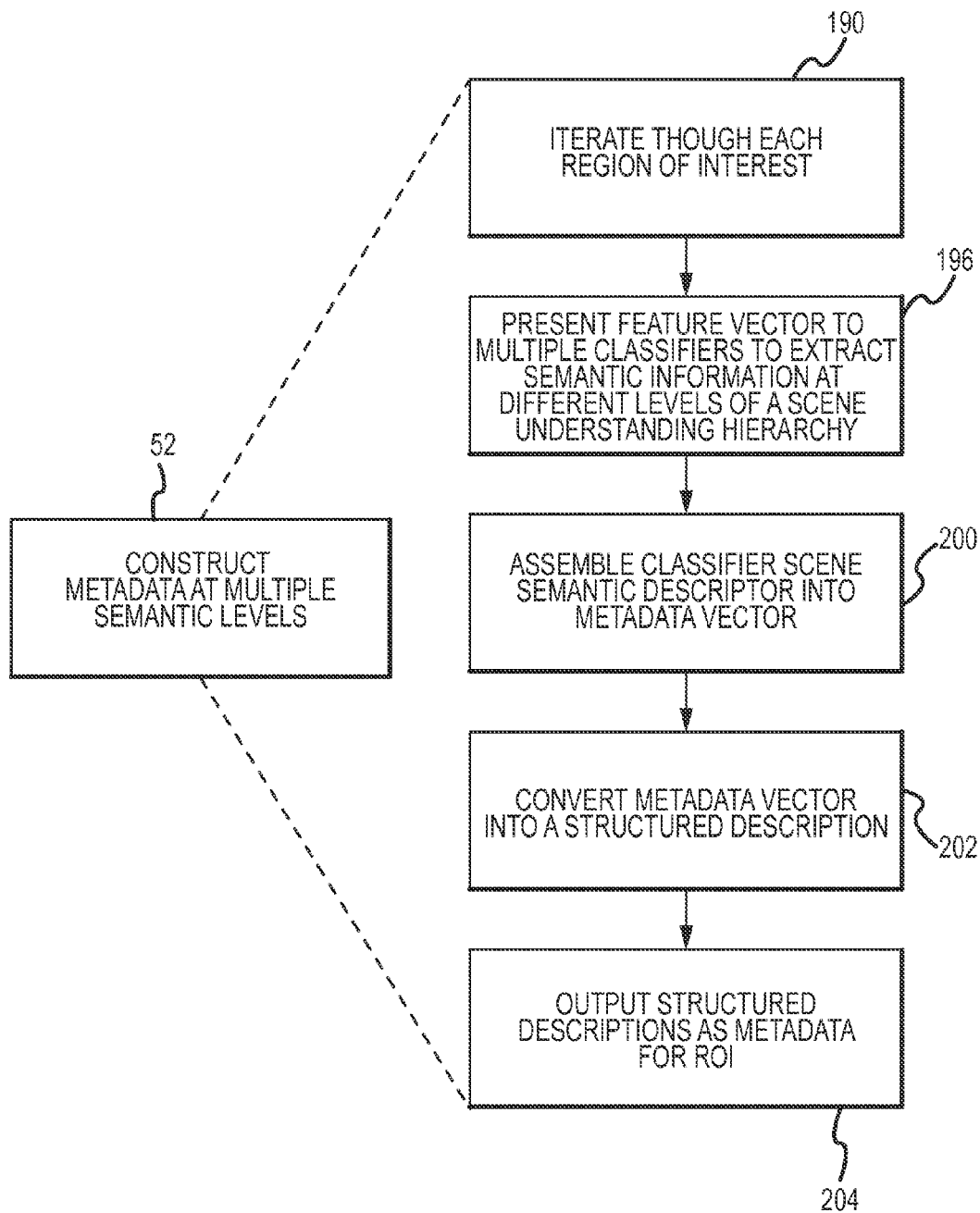

Referring now to FIGS. 12a and 12b, metadata is constructed at multiple semantic levels (step 52) by iterating through each ROI (step 190) to present each universal feature vector 192 to multiple classifiers 194 trained to extract semantic information at different levels of a scene understanding hierarchy in the form of scene semantic descriptors 195 (step 196), assembling the scene semantic descriptors into a metadata vector 198 (step 200), converting the metadata vector into a structured description (step 202) and outputting the structure description as metadata for the ROI (step 204). Each classifier is suitably an ARTMAP classifier which was designed to effectively classify high-dimensional feature vectors. The ARTMAP classifier is described by Carpenter, G. A., Grossberg, S., & Reynolds, J. H. "ARTMAP: Supervised real-time learning and classification of nonstationary data by a self-organizing neural network", Neural Networks (Publication), 4, 565-588, 1991 and Carpenter, G. A., Grossberg, S., Markuzon, N., Reynolds, J. H., & Rosen, D. B., "Fuzzy ARTMAP: A neural network architecture for incremental supervised learning of analog multidimensional maps", IEEE Transactions on Neural Networks, 3, 698-713, 1992, which are hereby incorporated by reference. The classifiers are suitably configured and trained to detect different patterns of the L1 to L5 features represented in the universal feature vector to recognize a plurality of object types, object-to-object relationships, activities and scene situations at different levels of the scene understanding hierarchy.

Figure 13:
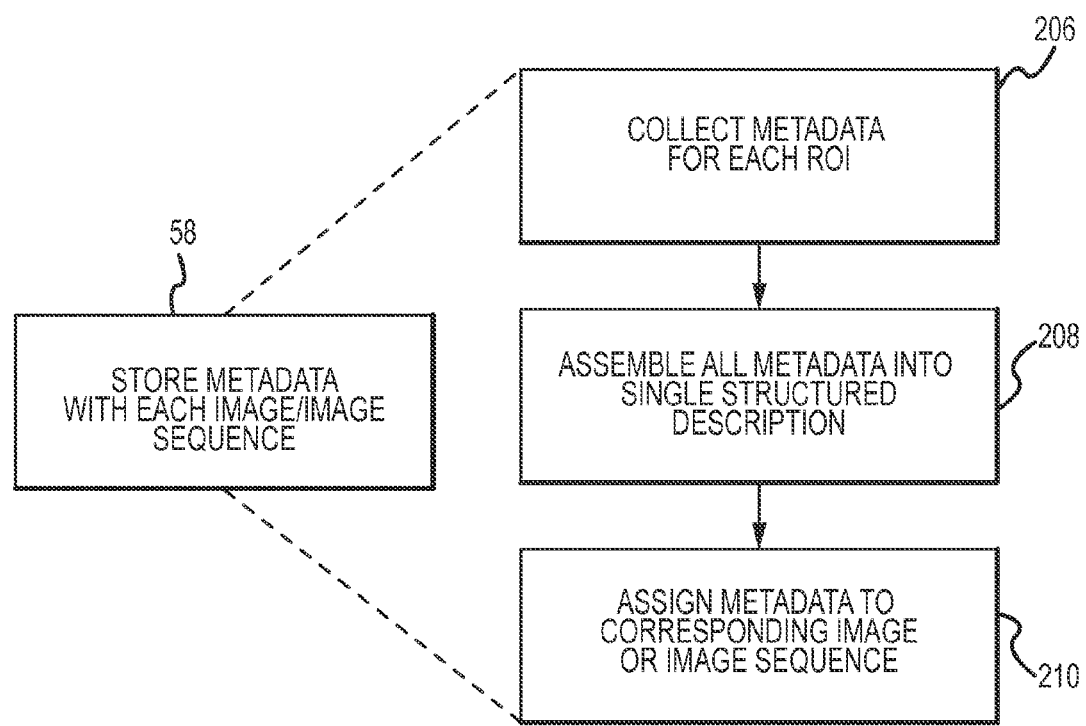
FIG. 13 is a flow diagram of an exemplary embodiment for assembling the metadata for each ROI into a single SQL statement.

Referring now to FIG. 13, metadata is stored with each image or image sequence (step 58) by collecting the metadata for each ROI in the current image (step 206), assembling all the metadata into a single structured description for the image (step 208) and assigning the metadata to the corresponding image or image sequence (step 210). In an embodiment, the relationships between the ROIs and between the ROIs and the scene are captured in the L3 and L5 features and the subsequent classification and extraction of semantic information. In other embodiments, additional interpretation could be performed on the structured descriptions for the individual ROIs to generate the single structured description.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of extracting universal scene descriptors (USDs) from a scene, comprising:
   providing a sequence of one or more unsegmented images of a scene;
   unsupervised decomposition of the scene captured in each said image into at least one region of interest (ROI), the scene in at least one said image decomposed into a plurality of ROIs;
   extracting multiple classes of biologically-inspired hierarchical visual features from each scene for each of the one or more ROI;
   assembling the visual features from the plurality of classes into a universal feature vector for each said ROI, each said universal feature vector providing a USD for the scene;
   for each ROI in each image, processing the corresponding universal feature vector to construct metadata at multiple semantic levels;
   converting the metadata into a structured description for each said ROI; and
   assembling the structured descriptions for all ROI in a scene into a single structured description.

2. The method of claim 1, wherein the scene captured in each said image is decomposed by identifying the N most salient regions of the scene where N is greater than 1.

3. The method of claim 2, wherein the N most interesting regions are identified by,
   computing a response of multiple spatial filters tuned for oriented structure in the scene as a set of coefficients C;
   estimating a density distribution for all coefficients C;
   estimating a joint likelihood for each coefficient with respect to coefficients from a neighborhood to provide a saliency; and
   selecting the N contiguous areas centered on locations in the scene with the highest saliency.

4. The method of claim 1, wherein said multiple classes of biologically-inspired hierarchical visual features comprise object-tuned features, object-tuned spatial-layout features, ROI-to-ROI geometric features, ROI spatial-layout features and scene spatial-layout features.

5. A method extracting universal scene descriptors (USDs) from a scene, comprising:
   providing a sequence of one or more unsegmented images of a scene;
   unsupervised decomposition of the scene captured in each said image into at least one region of interest (ROI), at least one said scene decomposed into a plurality of ROIs;
   extracting multiple classes of biologically-inspired hierarchical visual features from each scene for each of the one or more ROI; and
   assembling the visual features from the plurality of classes into a universal feature vector for each said ROI, each said universal feature vector providing a USD for the scene,
   wherein the universal feature vector has a standard definition for all ROIs in all images,
   wherein the universal feature vector has a fixed length and fixed feature value range for each class of features.

6. A method of extracting universal scene descriptors (USDs) from a scene, comprising:
   providing a sequence of one or more unsegmented images of a scene;
   unsupervised decomposition of the scene captured in each said image into at least one region of interest (ROI), the scene in at least one said image decomposed into a plurality of ROIs;
   extracting multiple classes of biologically-inspired visual features from the scene captured in each image for each ROI;
   assembling the visual features from the plurality of classes into a universal feature vector for each said ROI, each said universal feature vector providing a USD for the scene;
   presenting the universal feature vector for each ROI in each image to a plurality of classifiers that extract semantic information from the universal feature vector for the scene at different levels of a complex scene understanding hierarchy and output multiple scene semantic descriptors at multiple semantic levels;
   assembling the scene semantic descriptors into a metadata vector for each said ROI;
   converting the metadata vector into a structured description for each said ROI;
   assembling the structured descriptions for all ROI in a scene into a single structured description; and
   storing the structured description as metadata for the sequence of images.

7. The method of claim 6, wherein the visual features are assembled into the universal feature vector by,
   normalizing all features to a fixed range; and
   concatenating all visual features into a fixed length universal feature vector.

8. The method of claim 6, wherein each said classifier comprises a plurality of ARTMAP classifiers trained to extract semantic information from the universal feature vector at different levels of a complex scene understanding hierarchy.

9. The method of claim 6, wherein each image includes at least one region or interest (ROI), said multiple class of biologically-inspired visual features comprise object-tuned features, object-tuned spatial-layout features, ROI-to-ROI geometric features, ROI spatial-layout features and scene spatial-layout features, said classifiers configured to detect different patterns of said features to recognize a plurality of object types, object-to-object relationships, activities and scene situations at different levels of a complex scene understanding hierarchy.

10. The method of claim 6, wherein the extraction of USDs from scenes is generic to all applications, and wherein the configuration of the classifiers is specific to generate metadata for a particular application.

11. A method of extracting universal scene descriptors (USDs) from a scene, comprising:
   providing a sequence of one or more unsegmented images of a scene, each image including at least one region or interest (ROI);
   extracting biologically-inspired visual features from at least one ROI in each scene including an object-tuned L1 feature vector, an object-tuned spatial-layout L2 feature vector, a ROI-to-ROI geometric L3 feature vector, an ROI spatial-layout L4 feature vector and a scene spatial-layout L5 feature vector; and
   assembling the L1 through L5 feature vectors into a universal feature vector for each said ROI in the scene captured in each said image, each said universal feature vector providing a USD for the scene.

12. The method of claim 11, wherein object-tuned L1 features are extracted for each of said at least one ROI using a hierarchical filter bank by,
   performing edge detection using a first layer of the filter bank comprising filters tuned to edges in multiple orientations and scales;
   detecting multiple combinations of those edges using a second layer of the filter bank;
   combining the multiple combinations into multiple object parts using a third layer of the filter bank; and
   assembling the edges, combinations of edges and object parts into the L1 feature vector.

13. The method of claim 12, wherein object-tuned spatial-layout L2 features are extracted for each of said at least one ROI by,
   subsampling the object-tuned features L1;
   calculating a spatial layout measure of the subsampled object-specific features; and
   assembling the spatial-layout measure into the L2 feature vector.

14. The method of claim 11, wherein ROI-to-ROI geometric features are extracted for each said ROI by,
   calculating a vector describing the geometric relationship to at least one other ROI in the scene; and
   assembling the spatial vectors into the L3 feature vector.

15. The method of claim 11, wherein ROI spatial-layout features are extracted for each said ROI by,
   subsampling the scene data in the ROI;
   calculating spatial layout measures for the subsampled ROI; and
   assembling these measures into the L4 feature vector.

16. The method of claim 11, wherein scene spatial-layout features are extracted by
   subsampling the scene;
   applying a series of spatial filters to the subsampled scene;
   calculating a scene spatial layout measure from the filters output;
   classifying the scene as one of a plurality of labeled scenes based on the scene spatial layout measure; and
   assembling the scene label as the L5 vector.

17. A method of extracting universal scene descriptors (USDs) from a scene, comprising:
   providing a sequence of one or more unsegmented images of a scene;
   unsupervised decomposition of the scene captured in each said image into the N most salient region of interest (ROI) where N is greater than one;
   extracting biologically-inspired visual features from the scene for each said image including object-tuned features, object-tuned spatial-layout features, ROI-to-ROI geometric features, ROI spatial-layout features and scene spatial-layout features for each ROI;
   assembling the visual features from the plurality of classes into a universal feature vector for each said ROI, each said universal feature vector providing a USD for the scene;
   presenting the universal feature vector for each ROI to a plurality of classifiers that extract semantic information from the scene at different levels of a complex scene understanding hierarchy and output scene semantic descriptors;
   assembling scene semantic descriptors into a metadata vector for each said ROI;
   converting the metadata vector into a structured description for each said ROI;
   assembling the structured descriptions for all ROI in a scene into a single structured description; and
   storing the structured description for each said image of the scene as metadata for the scene.

18. The method of claim 17, wherein the N most salient ROI are determined by,
   computing response of multiple spatial filters tuned for oriented structure in the scene as a set of coefficients C;
   estimating a density distribution for all coefficients C;
   estimating a joint likelihood for each coefficient with respect to coefficients from a neighborhood to provide a saliency; and
   selecting the N contiguous areas centered on locations in the scene with the highest saliency.

19. The method of claim 17, wherein the visual features are assembled into the universal feature vector by,
   normalizing all features to a fixed range; and
   concatenating all visual features into a fixed length universal feature vector.

20. The method of claim 17, wherein each said classifier comprises an ARTMAP classifier trained to extract semantic information from the USD for the scene at different levels of a complex scene understanding hierarchy.

21. The method of claim 1, wherein said multiple classes of biologically-inspired hierarchical visual features comprise an object-tuned L1 feature and at least one of ROI-to-ROI geometric L3 features, ROI spatial-layout L4 features and scene spatial-layout L5 features.

22. The method of claim 6, wherein said multiple classes of biologically-inspired hierarchical visual features comprise an object-tuned L1 feature and at least one of ROI-to-ROI geometric L3 features, ROI spatial-layout L4 features and scene spatial-layout L5 features.

* * * * *